United States Patent
Swift et al.

(10) Patent No.: US 7,113,994 B1
(45) Date of Patent: Sep. 26, 2006

(54) SYSTEM AND METHOD OF PROXY AUTHENTICATION IN A SECURED NETWORK

(75) Inventors: Michael M. Swift, Seattle, WA (US); Neta Amit, Haifa (IL); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/490,199

(22) Filed: Jan. 24, 2000

(51) Int. Cl.
*G06F 15/16* (2006.01)

(52) U.S. Cl. ............ 709/229; 709/200; 707/9; 707/10; 707/513; 395/187.01

(58) Field of Classification Search ............ 707/201, 707/3, 7, 104.1, 10, 9, 104; 713/201, 153, 713/151, 168; 395/187.01, 186, 200.5
See application file for complete search history.

(56) References Cited

U.S. PATENT DOCUMENTS

| | | | |
|---|---|---|---|
| 5,623,601 A * | 4/1997 | Vu .................... | 713/201 |
| 5,913,025 A * | 6/1999 | Higley et al. ........ | 713/201 |
| 5,983,350 A * | 11/1999 | Minear et al. ....... | 713/201 |
| 6,012,088 A * | 1/2000 | Li et al. .............. | 709/219 |
| 6,081,900 A * | 6/2000 | Subramaniam et al. .. | 713/201 |
| 6,198,824 B1 * | 3/2001 | Shambroom .......... | 380/279 |
| 6,298,383 B1 * | 10/2001 | Gutman et al. ....... | 709/229 |

OTHER PUBLICATIONS

J. Kohl and C. Neuman: Request for Comments RFC1510—"The Kerberos Network Authentication Service" Sep. 1993, available at ftp://ftp.isi.edu/in-notes/rfc1510.txt (accessed on Nov. 21, 2000).
B. Clifford Neuman and Theodore Ts'o: "Kerberos: An Authentication Service for Computer Networks", USC/ISI Technical Report No. ISI/RS-94-39: Copyright 1994 Institute of Electrical and Electronics Engineers, IEEE Communications Magazine, vol. 32, No. 9, pp. 33-38, Sep. 1994.
"Windows 2000 Kerberos Authentication" Microsoft Windows NT Server, White Paper, Copyright 1999 Microsoft Corporation.
Wei Hu "DCE Security Programming", Copyright 1995, O'Reilly & Associates, Inc.

* cited by examiner

*Primary Examiner*—Charles Rones
*Assistant Examiner*—Belix M. Ortiz
(74) *Attorney, Agent, or Firm*—Lee & Hayes, PLLC

(57) ABSTRACT

A method of controlling access to network services enables an authorized proxy client to access a service on behalf of a user. To permit the client to function as a proxy, the user registers proxy authorization information with a trusted security server. The proxy authorization information identifies the proxy client and specifies the extent of proxy authority granted to the proxy client. When the proxy client wants to access a target service on behalf of the user, it sends a proxy request to the trusted security server. The trusted security server checks the proxy authorization information of the user to verify whether the request is within the proxy authority granted to the proxy client. If so, the trusted security server returns to the proxy client a data structure containing information recognizable by the target service to authenticate the proxy client for accessing the target service on behalf of the user.

20 Claims, 6 Drawing Sheets

SYSTEM AND METHOD OF PROXY AUTHENTICATION IN A SECURED NETWORK

TECHNICAL FIELD OF THE INVENTION

This invention relates generally to network security, and more particularly to the control of access to services in a network by means of user authentication.

BACKGROUND OF THE INVENTION

In a computer network environment, access to services is often restricted for security reasons, and a user attempting to access a server has to be authenticated before access can be granted. In many network systems, the user authentication process is based on the password of the user. User authentication prevents a malicious attacker from illegally gaining access to services by pretending to be an authorized user.

The requirement of user authentication for network security, however, can conflict with the need for delegation or appointing a proxy. There are many occasions in which a user intends to have another user or a service perform tasks on her behalf when she is not logged onto the network. For example, a user who will be out of her office for an extended period of time may want another user to access her files during her absence. Access to those files may be restricted for only the first user and requires user authentication based on her password. Due to security concerns, the first user may not want to give her password to the second user. Without her password, however, the second user will not be able to access the files of the first user. If the first user does decide to give her password to the second user, she will be taking the risk that second user may use her password for other unauthorized purposes in or after the supposed duration of the proxy authorization.

As another example, a user may submit a batch job to a batch service and then log off, expecting the batch service to run the batch job in the background without further attention of the user. To run the batch job, it is likely that the batch service will have to access services that the user submitting the batch job is authorized to access. Due to the requirement of user authentication for accessing services, however, the batch service cannot gain-access to those services by simply holding itself out as the batch user.

Existing batch services solve this problem by taking approaches that are not satisfactory. Under one approach, the requirement for user authentication is simply waived. The operating system of the service is told to perform subsequent actions on the batch user's account without requiring authentication from that user. The problem of this approach is that all the computers running the batch jobs must be highly trusted and secure, because they can act as the user without authentication while the batch job is running. An alternative is to modify permissions on the objects that the batch job needs to access. It is, however, difficult to know in advance which objects will be accessed. Furthermore, the user may not have the authority to change the access permissions of the objects, such as when the security of the objects is managed by someone else.

Under another existing approach, the user's password is given to the batch service, which stores the password and uses it to instantiate the batch job. The aspect of requiring the user to give her password to another entity, in this case the batch service, causes serious security concerns. There may be many batch jobs submitted to the batch service by different users, and the batch service will store the passwords of all of those batch users. If an attacker breaks into the batch service, he will find out the passwords of all the batch users. He can then act as any of those batch users and authenticate properly because he knows the password of that user.

Besides the security concerns, this approach may also encounter problems when the user who submitted a batch job changes her password. Many batch jobs are run periodically or continuously for months or even years. During the lifetime of the batch job, it is possible that the user will change her password one or more times. If the user changes her password but forgets to notify the batch service of the new password, the batch service can no longer authenticate itself as the user. As a result, access to the services will be denied and the batch job will fail.

Accordingly, there is a need for a mechanism for one user in a secured network to allow another user or a service to act as her without requiring the first user to divulge her password or other secrets, and preferably such mechanism allows such delegation or proxy to operate for an extended period without being affected by the user's changing her password.

SUMMARY OF THE INVENTION

In view of the foregoing, the present invention provides a method and system of controlling access to services in a network that enables an authorized proxy client to access a service on behalf of a user. To permit the proxy client to function as a proxy, the user first registers with a trusted security server proxy authorization information that identifies the proxy client and specifies the extent of proxy authority granted to the proxy client. When the proxy client wants to access a target service on behalf of the user, it sends a proxy access request to the trusted security server. The trusted security server checks the proxy authorization information of the user to verify whether the request is within the proxy authority granted to the proxy client. If so, the trusted security server returns to the proxy client a data structure containing information recognizable by the target service to authenticate the proxy client for accessing the target service on behalf of the user.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
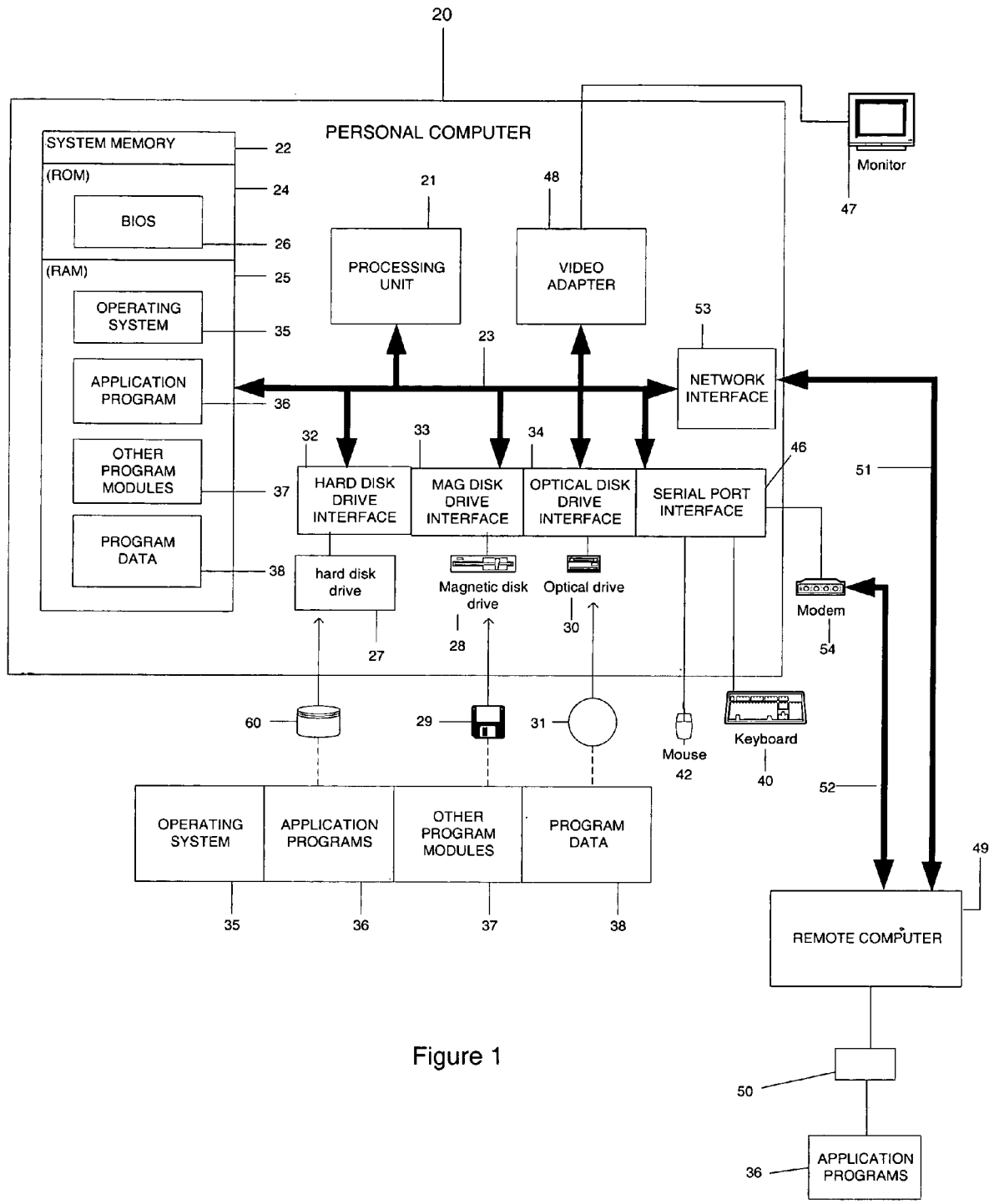
FIG. 1 is a block diagram generally illustrating an exemplary computer system usable for forming a network system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37; and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through, a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
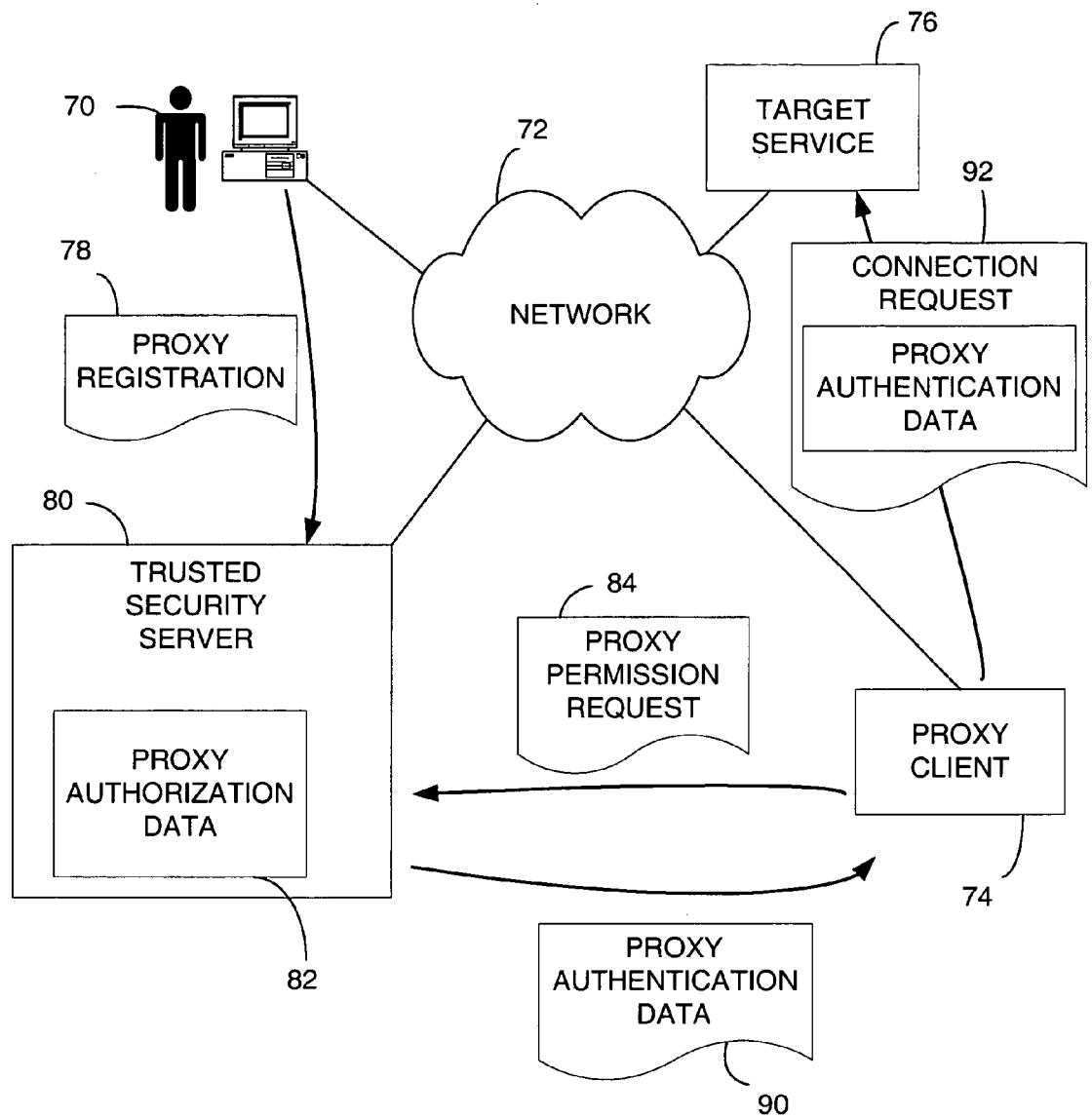
FIG. 2 is a schematic diagram showing a system in which a proxy client is permitted to access a target service on behalf of a user in accordance with the invention.

Referring now to FIG. 2, the present invention is directed to a mechanism by which a user 70 of a computer network 72 is able to give proxy authorization to a client 74 in the network, and the authorized client is able to authenticate itself for accessing a service 76 on behalf of the user, without having to give confidential security data of the user, such as the user's password, to the proxy client for the purpose of authenticating the client by the service. To give the proxy authorization, the user 70 submits a proxy registration request 78 to a trusted security server 80. The proxy registration request 78 provides proxy authorization data that identify one or more clients permitted to act as a proxy of the user and specify the extent of the proxy, such as which services a proxy client is allowed to access on the user's behalf and the lifetime of the proxy authorization. The proxy authorization data 82 are stored by the trusted security server 80 in its database.

When the proxy client 74 acting as a proxy of the user 70 needs to access the target service 76, it first sends a proxy access request 84 to the trusted security server 80. The proxy access request 84 identifies the user 70 that authorized the proxy and the target service 76 the proxy client wants to access. After receiving the proxy access request 78, the trusted security server 80 retrieves the proxy authorization data of the specified user and determines whether the proxy access request should be allowed. In doing so, the trusted security server 80 considers, for example, whether the client 74 or a group that includes the client is identified in the authorization data, whether restrictions specified in the authorization data apply to the client or the target service 76, and whether the term of the proxy authorization has expired.

If the trusted security server 80 determines that the proxy client 74 should be permitted to access the target service 76 on behalf of the user 70, it creates a data structure 90 containing authentication information recognizable by the target service 76 for authenticating the proxy client acting as the user to access the target service. The format and contents of the proxy authentication data structure 90 depends on the security protocols used and their implementations in the network system. For instance the proxy authentication data structure may be in the form of a "ticket" containing data encrypted with a secret key of the target service as in a preferred embodiment, or in other forms that may be commonly referred to as "certificates" or "capabilities." In a preferred embodiment, the proxy authentication data structure may be given to the proxy client. The proxy client 74 can then include the data structure in an access request 92 as part of its credentials presented to the target service 76 for authentication. Alternatively, the proxy authentication data structure may be given to the target service 76, which stores it for authenticating the proxy client when the proxy client attempts to access the target service.

In a preferred embodiment, the proxy access control of the invention is built upon a network security system that implements the Kerberos version 5 authentication protocol. To facilitate a description of this embodiment, the basic operation of the Kerberos authentication process is first described below.

Figure 3:
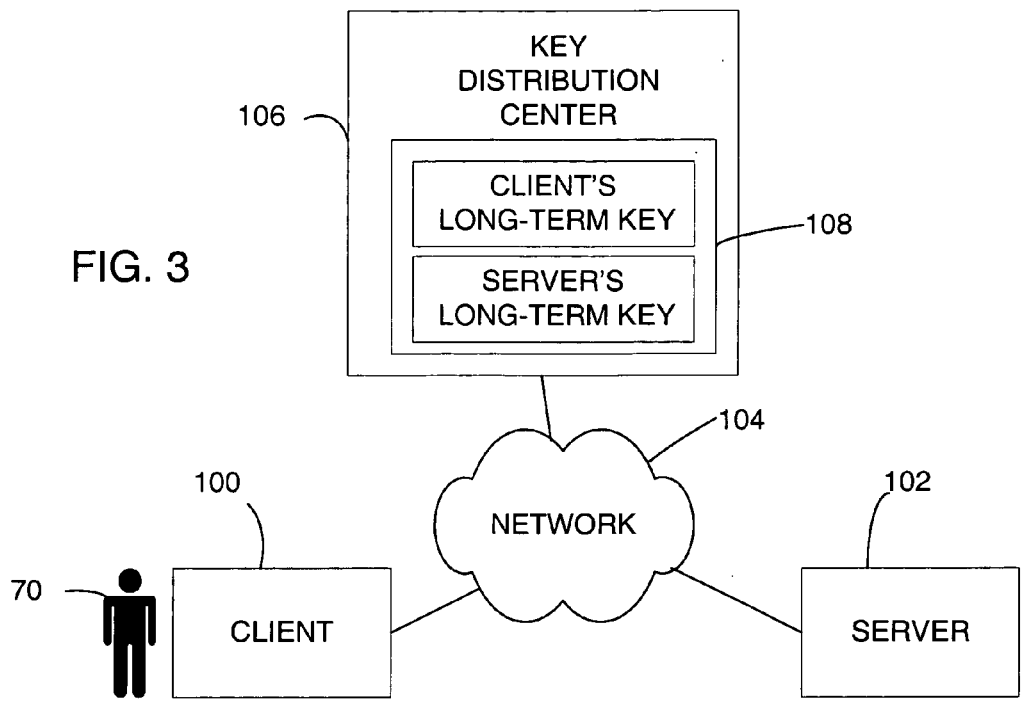
FIG. 3 is a schematic diagram showing a network that implements network security based on the use of session keys and tickets for authentication.
Figure 4:
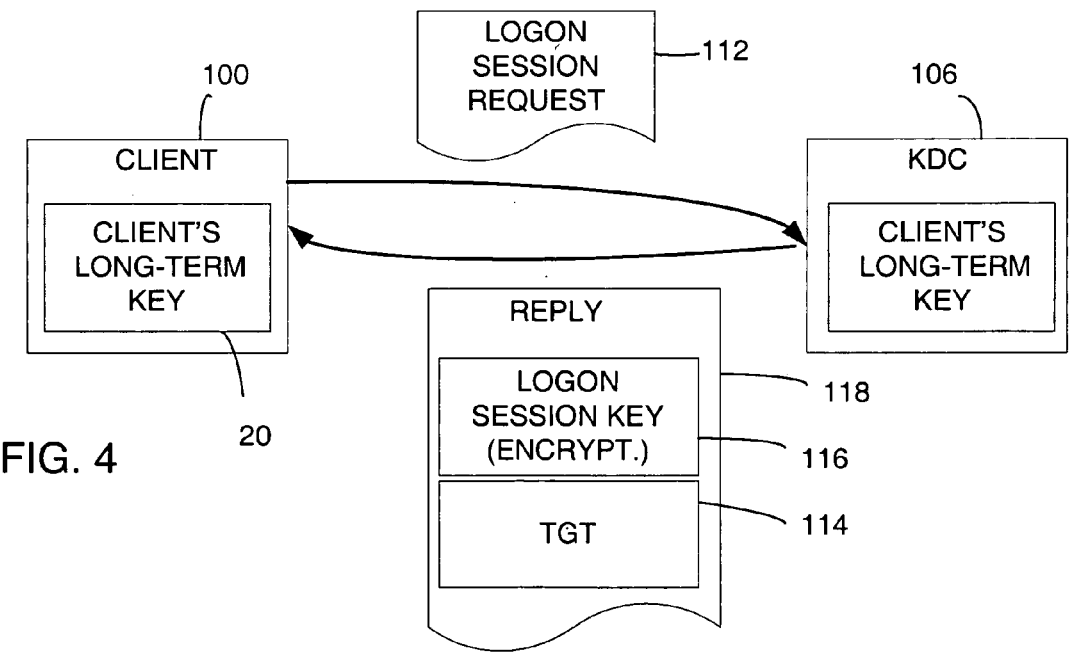
FIG. 4 is a schematic diagram showing data exchange between a client and a key distribution center for establishing communication therebetween.

Referring to FIG. 3, the Kerberos authentication protocol provides a mechanism for mutual authentication between a client 100 and a server 102, or between one server and another, before a network connection is opened between them. The protocol assumes that the initial transactions between the client 100 and the server 102 take place on an open network 104 where most computers are not physically secure and packets traveling between them may be monitored and modified by others.

The Kerberos protocol relies heavily on an authentication technique involving shared-key cryptography. Specifically, communication partners share a secret cryptography key. One party proves knowledge of the secret key by encrypting a piece of information, the other by decrypting the encrypted information and verifying the validity of the information. The secret key for the communication is distributed by a Kerberos key distribution center (KDC) 106, which functions as a trusted entity in this authentication scheme. The KDC 106 is a service that runs on a physically secured server. It maintains a database 108 with account information for all security principals in its "realm" or domain. Along with other information about each security principal, the KDC stores a cryptography key known only to that security principal and KDC. This key is used in exchanges between the security principal and the KDC and is known as a "long-term key." In most implementations, the long-term key is derived from a user's logon password.

Under the Kerberos protocol, when a client wants to establish a session with a server, it has to first obtain a session key and a session ticket for authentication purposes. The session key and the session ticket are issued by the KDC upon request by the client. Since the KDC is itself a server, the client has to obtain a session key and a session ticket for transactions with the KDC before it can request for session keys and tickets for other services. To that end, the user of the client has to be authenticated based on her password. When a user 70 logs on, the Kerberos client 100 on her computer accepts her password and converts it into a cryptographic key by passing the text of the password through a one-way hash function. The result is the user's long-term key. The KDC 106, on the other hand, gets its copy of the user's long-term key 110 from the record about the user in its database. Immediately after accepting the user's password and deriving the user's long-term key, the Kerberos client 100 on the user's computer sends a request 112 to the KDC 106 for a session key and a session ticket for use in subsequent transactions with the KDC during this logon session. The request 112 identifies the user 70. Depending on the specific implementation of the Kerberos protocol, the request 112 may also contain data encrypted with the user's long-term key for proving to the KDC that the user knows her password.

When the KDC 106 receives a request from the Kerberos client on the user's computer, it searches its database for the user, retrieves the user's account record, and takes the long-term key from a field in the record. If the request contains encrypted data, the KDC may also decrypt the data with the long-term key of the purported user. The KDC 106 responds to the request 112 by returning a session ticket for itself. This special session ticket 114 for communicating with the KDC is called a "ticket-granting ticket" ("TGT"). Like an ordinary session ticket, a TGT 114 contains a copy of the session key that the server, in this case the KDC 106, will use to communicate with the client 100. Like any other session key, the session key in the TGT is for temporary use, valid only until the TGT expires or the user logs off. For this reason, it is called a "logon session key." The TGT is encrypted with the long-term key of the KDC. The response also includes a copy of the logon session key 116 encrypted with the user's long-term key.

When the client 100 receives the KDC's reply 118 to its initial request 112, it uses its cached copy of the user's long-term key 120 to decrypt the encrypted copy of the logon session key 116 in the reply. It may then discard the long-term key derived from the user's password since it is no longer needed, and use the logon session key in all subsequent exchanges with the KDC 106.

Figure 5:
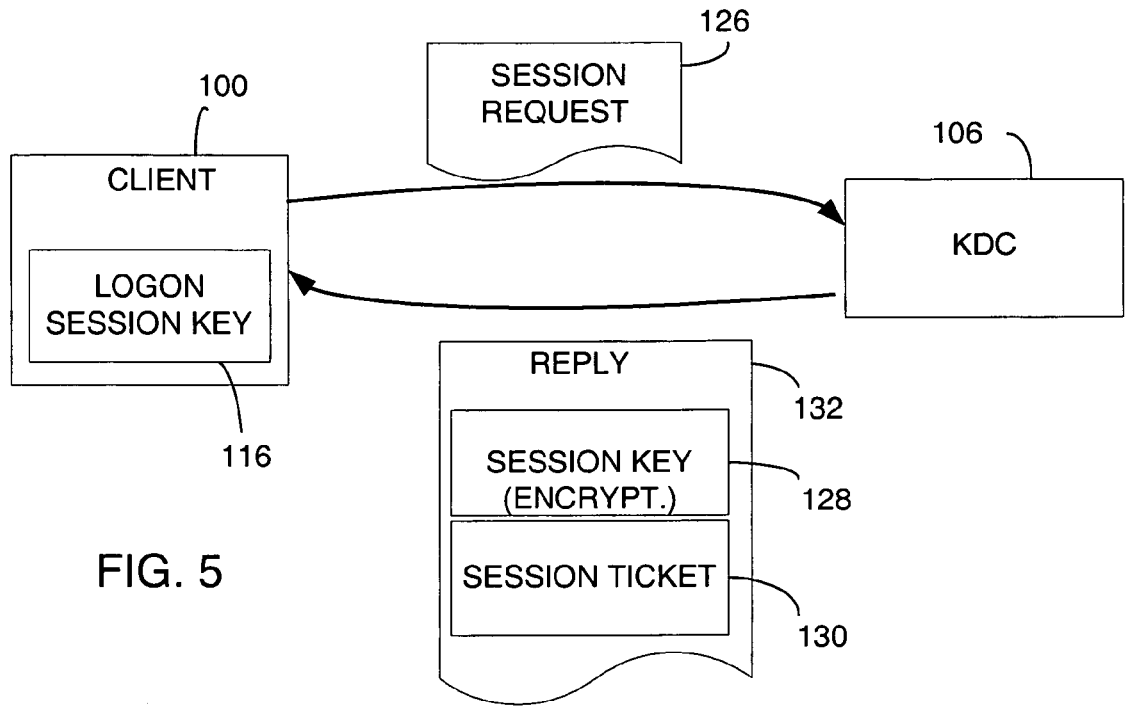
FIG. 5 is a schematic diagram showing a client requesting a session ticket for accessing a server.

Referring now to FIG. 5, when the client 100 wants to access to a server 102 other than the KDC, it sends a request 126 to the KDC 106. The KDC 106 responds to the request 126 by sending two copies of a cryptographic key, one for the requesting client and the other for the server, to be used in a session between the client and the server. This key is accordingly referred to as the "session key." The client's copy of the session key 128 is encrypted with the logon session key 116 that the client obtained earlier from the KDC. The server's copy of the session key is embedded along with information about the client in a data structure referred to as a session ticket 130. The session ticket 130 is encrypted with the long-term key that is shared by the KDC with the server. In this way, the client is given a session key and an encrypted session ticket that can be used to establish communication with the server. The session ticket 130, with the server's copy of the session key safely embedded therein, is the client's responsibility to manage. In this regard, the KDC 106 is simply providing a ticket-granting service and is not concerned with whether the server ever receives the session key.

Figure 6:
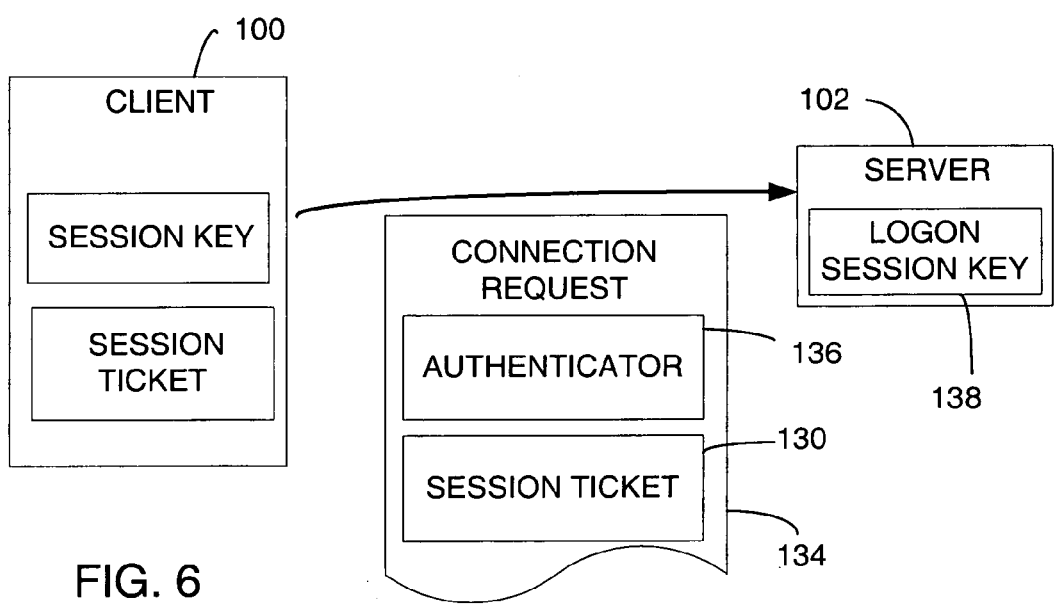
FIG. 6 is a schematic diagram showing a client presenting a session ticket to a server for authentication.

When the client 100 receives the KDC's reply 132 to its request 126, it extracts its copy of the session key 128 and the session ticket from the reply and puts both aside in a secure cache. Turning now to FIG. 6, when the client 100 wants to access the server 102, it sends the server a connection request 134 that includes the session ticket 130, which is still encrypted with the server's logon session key shared with the KDC, and an authenticator 136, which contains data that can be validated by the server. For instance, the authenticator may include a time stamp encrypted with the session key 128. The session ticket 130 and the authenticator 136 together form the client's credentials presented to the server 102 for authentication purposes.

When the server 102 receives the connection request 134 from the client 100, it decrypts the session ticket therein with its logon session key 138 issued by the KDC 106 to extract the session key in the ticket. It then uses the session key to decrypt the authenticator 136. If the decryption is successful and the contents of the authenticator are valid, the server 102 knows that the client's credentials were issued by a trusted authority, namely the KDC 106. If the client 100 has asked for mutual authentication, the server 102 uses the session key to encrypt a portion of the data in the client's authenticator, such as the time stamp, and sends the encrypted portion to the client as the server's authenticator. The server is authenticated when the client successfully decrypts the server's authenticator and verifies the data therein.

The Kerberos protocol includes three subprotocols. The subprotocol in which the KDC gives a client a logon session key and a TGT is known as the Authentication Service (AS) Exchange. The subprotocol in which the KDC distributes a service session key and a session ticket for a requested service to the client is known as the Ticket-Granting Service (TGS) Exchange. The subprotocol in which the client presents the session ticket for admission to a service is called the Application Protocol (AP) Exchange.

Figure 7:
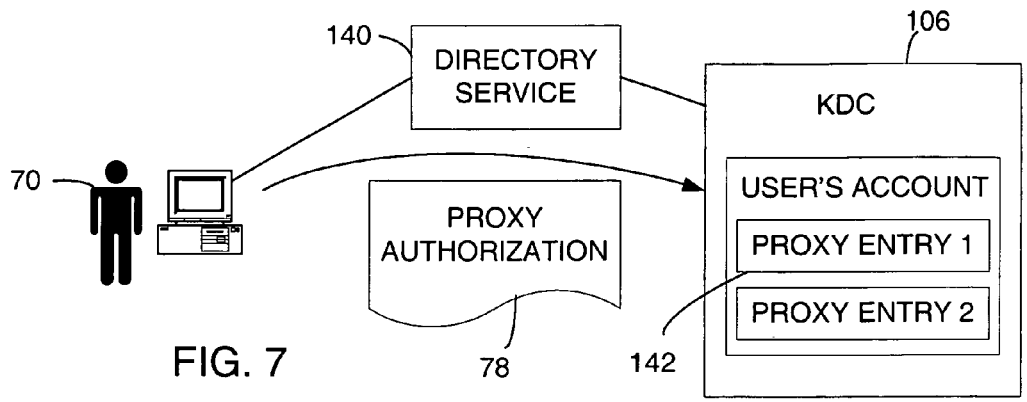
FIG. 7 is a schematic diagram showing an embodiment of the invention in which a user registers proxy authorization information with a key distribution center.
Figure 8:
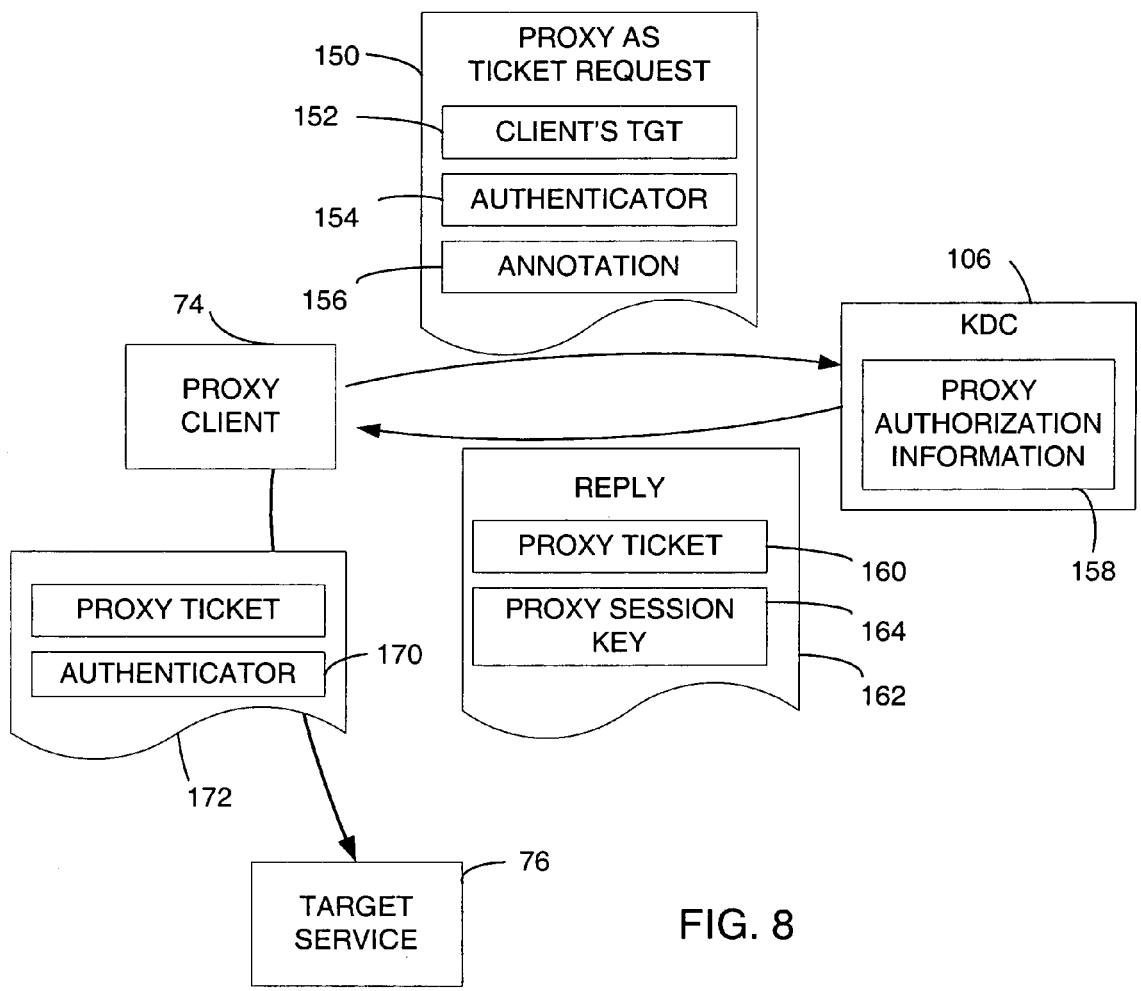
FIG. 8 is a schematic diagram showing the embodiment of FIG. 7 in which a proxy client obtains a ticket for accessing a target service on behalf of a user.

With an understanding of the basic security scheme under the Kerberos version 5 authentication protocol as described above, the implementation of a preferred embodiment of the invention built upon the Kerberos system will now be described. In this embodiment as shown in FIGS. 7 and 8, a user 70 intends to give proxy authority to a client 74 or a group of clients to act on her behalf to perform a task that requires access to a target service 76. In this embodiment, a Kerberos key distribution center (KDC) 106 functions as the trusted security server 80 in the architecture shown in FIG. 2. The proxy authentication procedure begins when the user 70 sends a proxy registration request 78 to a directory service 140 to create a proxy entry. The request 78 contains information to be included in the proxy entry to specify who is allowed to be a proxy and what the proxy is allowed to do. Specifically, the proxy entry preferably includes the following data:

an identification of the user;
the security identifier (SID) of a security principal that is permitted to act on behalf of the user (i.e., be a proxy of the user);
the duration of the permission; and
restrictions on the permission.

The security principal identified in the proxy entry may be either a client on the network or a group of clients. The data on the restrictions on the proxy permission may indicate, among other things, which target services the proxy is permitted to access on behalf of the user 70. By way of example, the proxy entries for the user may contain the following data:

Proxy Permission Entries for User #1
GrantedAccountSID1, 20-may-1999, all services
GrantedGroupSID2, 31-dec-2001, 1dap/ntdev.Microsoft.com where GrantedAccountSID1 is the SID of a client permitted to be a proxy of the user, and GrantedGroupSID2 is the SID of a group of clients, each of which is allowed to be a proxy. The dates in this example indicate the expiration dates for the proxy permissions for the respective principals. The third field of the proxy entry in this example identifies the services the proxy is allowed to access on behalf of the user. Such restriction data may be specified in many different ways with different granularity. For instance, this field may be used to specify groups or individual clients that the proxy can access. Alternatively, the field can provide a negative restriction by identifying those services the proxy should not be allowed to access. The field may identify specifically the directory the proxy is allowed to access, as in the second proxy entry in the example.

The request 78 by the user 70 to create a proxy entry is sent directly to the KDC 106. In one embodiment, the transmission is over an RPC connection. Other network communication protocols, such as those based on sockets or datagrams, may be used for such transmission. After receiving the request, the KDC 106 creates the proxy entry 142 using the information in the request and stores the proxy entry in encrypted form under the requesting user's account in its directory. This proxy authorization information is secured in the sense that it is not accessible from outside the directory service or under any other protocol. This ensures that a user may grant proxy authorization only on her own account, and no user is allowed to grant proxy authorization on another user's account. In this regard, the authentication process by the KDC 106 on the user that sent the request ensures that the purported user making the request is in possession of his or her password. The authentication of the requesting user further prevents a user from maliciously granting herself proxy permissions on another user's account. The interface with the KDC allows a user to retrieve the current list of granted proxy permissions on her account and to manage the list by modifying the proxy entries.

Instead of having the users register proxy authentication for selected proxies, a system administrator may also be allowed to register proxy authentication regarding a given user. In this way, the administrator can enable certain trusted services to act as proxies for selected users. For example, the administrator can register a web server that supports a variety of authentication methods as a proxy for all of its Internet clients. The web server in its proxy capacity can then be used to allow Internet clients using different authentication methods to communicate with a target service that uses only one authentication protocol, such as the Kerberos protocol.

Once the proxy authorization for the client 74 or a group including the client has been registered with the KDC 106, the client can request a ticket for accessing a target service 76 on behalf of the user. To that end, the client 74 first establishes authenticated communication with the KDC 106. As implemented in a preferred embodiment, the client 74 constructs an authentication service (AS) ticket request 150 for the user's account according to the normal format of the Kerberos protocol. The client then inserts into the request 150 a piece of pre-authentication information that includes a ticket granting ticket 152 issued to the client 70 for the user's domain, an authenticator 154 for that ticket, and an annotation string 156 describing the purpose of the request, namely to obtain permission for the client to act as a proxy for the user. The client 74 then sends the AS ticket request with the pre-authentication data to the user's KDC 106. It should be noted that at this time the user may no longer be logged onto the network.

When the KDC 106 receives the AS ticket request 150 from the client 74, it pulls the user's name from the request and retrieves proxy entries of that user from its database. It then pulls out the requesting client's ticket-granting ticket 152 and verifies it according to the normal Kerberos protocol. The KDC 106 also verifies that the authenticator 154 in the request is valid. The authenticator proves that the requesting client is allowed to use the ticket-granting ticket included in the request. Thus, the client is authenticated, i.e., it is shown to be who it claims to be, rather than acting as someone else.

After the client 74 has been authenticated, the KDC 106 constructs the requesting client's SID as well as a list of SIDs of the groups of which the client is a member. The KDC then goes through the list 158 of proxy permissions of the user identified in the proxy ticket request 150, checking each entry to determine: (1) whether the entry's SID matches the client's SID or one of its group SIDs; (2) whether the entry's allowed target list matches the target service specified in the request; (3) whether the entry is still valid, i.e., the lifetime of the proxy permission as specified in the entry has not expired. If no entry passes these inquiries, the client's request will be denied.

On the other hand, if one or more matches are found, the KDC finds the most general proxy entry that matches the client's request, preferably first by range of services and second by expiration date. Based on that entry, the KDC constructs a ticket 160 for the client that allows the client to access the target service 76 on behalf of the user 70. In this regard, the proxy client may either request a ticket-granting ticket (TGT) that allows it to make a subsequent request for a session ticket for accessing a target service, or may directly request a session ticket for a specific target service. When a TGT is requested, the KDC can store in the TGT for its own reference information regarding what the TGT may be used for. The ticket returned by the KDC in response to the AS request with the proxy client's TGT is the "proxy ticket."

The proxy ticket is set to expire no later than the lifetime of the proxy permission of the selected entry. In the authorization data field of the proxy ticket 160, the KDC includes a record containing the following information:
  the annotation string from the client's request;
  the name of the client that sent the request;
  the realm of the client;
  the security identifier (SID) of the client.

In an alternative embodiment, rather than including only the name, domain, and SID of the proxy client, all of the group SIDs for the proxy client may be included as well.

The KDC then constructs a reply message 164 in response to the request. The reply message 162, including the proxy ticket 160 and a session key 164, is encrypted using the session key from the requesting client's ticket-granting ticket 152. It is to be noted that under the regular Kerberos procedure a reply to an AS ticket request will be encrypted with a long-term key derived from the requesting user's password. By using the proxy client's logon session key in the TGT 152 to encrypt the reply, the client is able to use the proxy ticket 160 without knowing the user's password.

In one embodiment, the proxy ticket 160 is a ticket-granting ticket for the proxy client acting as the user. After the proxy client 74 has obtained a ticket granting ticket as a proxy of the user, it may then request additional tickets to additional services and authenticate itself to those services as the user.

In an alternative embodiment, the proxy ticket may be a session ticket that the proxy client 74 can use to directly authenticate to the target service 76. The authentication data in the ticket allows the target service 76 to recognize that the access request is coming from an authorized proxy instead of the user, and to identify the proxy client. This information may be stored and later audited to assign responsibility to actions performed by the proxy under the name of the user.

Figure 9:
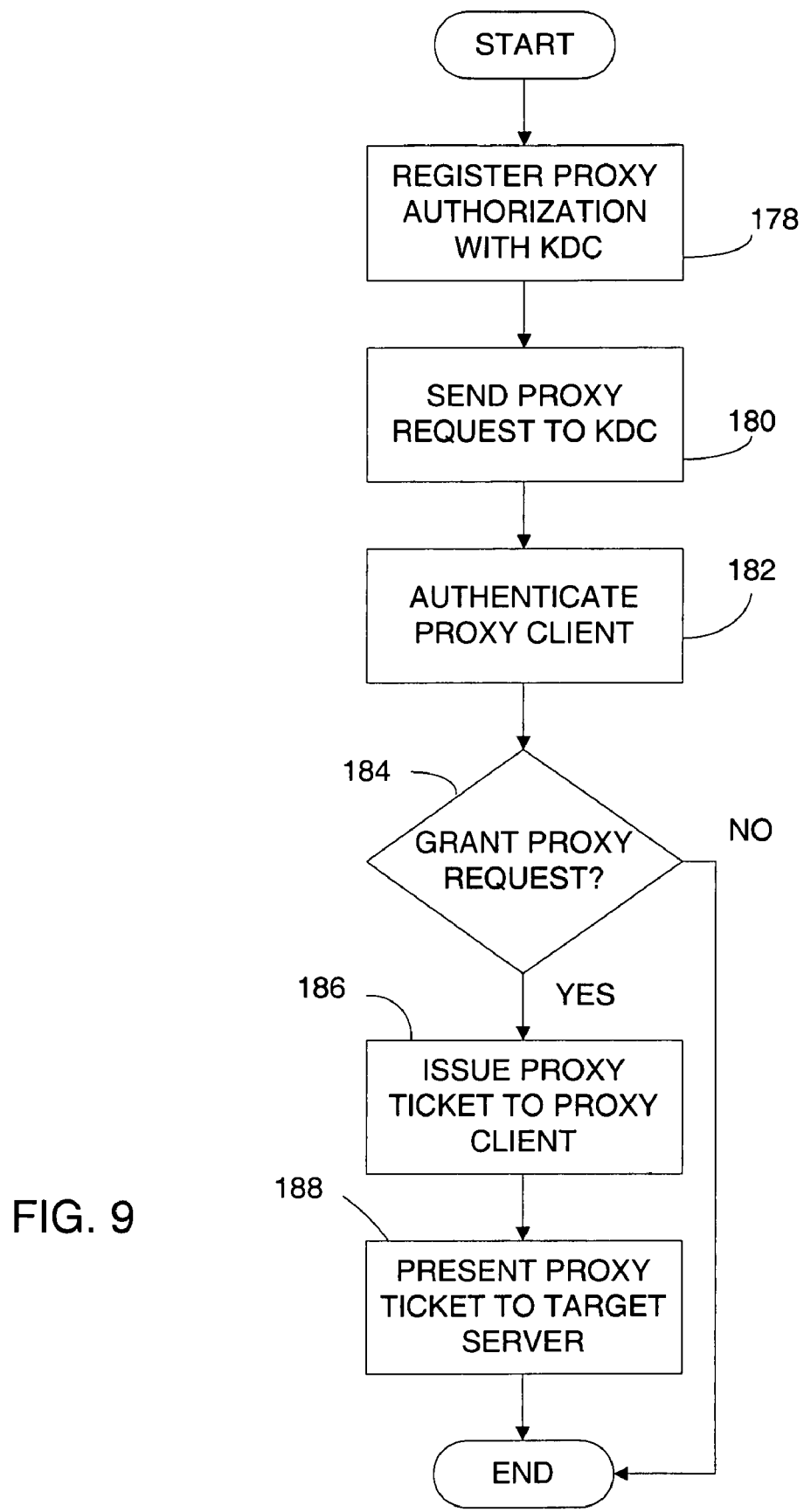
FIG. 9 is a flowchart showing a process of proxy authentication in the embodiment of FIGS. 7 and 8.

The proxy authentication process in the embodiment described above is summarized in FIG. 9. To allow a proxy client to act on her behalf, a user first registers proxy authorization data with a KDC of its domain (step 178). When the proxy client wants to access a target service on behalf of the user, it sends a proxy permission request to the KDC of the user's domain (step 180). The request includes a TGT for the client so that the client can be authenticated by the KDC. When the KDC receives the request, it first authenticates the client based on the TGT (step 182). It then checks the proxy authorization information provided by the user to see whether the proxy client has been authorized to work as proxy to access the target service (step 184). If the proxy request should be granted, the KDC includes in its reply to the proxy client a proxy ticket encrypted with the session key in the TGT in the request (step 186). The client can then gain access to the target service by using the proxy ticket for authentication (step 186). In this way, the proxy client is able to gain access to the target service without the need to know the user's password or other secrets.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of enabling a proxy client in a secured network to access a target service on behalf of a user, comprising the steps of:
   registering proxy authorization information regarding the user with a trusted security server, the proxy authorization information identifying the proxy client and an extent of proxy authorization granted the proxy client by the user;
   submitting, by the proxy client, a proxy request to the trusted security server requesting access to the target service on behalf of the user;
   comparing, by the trusted security server, the proxy request with the registered proxy authorization information of the user to determine whether to grant the proxy request;
   issuing, by the trusted security service, a data structure containing authentication data recognizable by the target service for authenticating the proxy client for accessing the target service on behalf of the user, if it is determined to grant the proxy request.

2. A method as in claim 1, wherein the data structure is a ticket containing a session key for use in a session formed between the proxy client and the target service.

3. A method as in claim 2, wherein the ticket is encrypted with a secret key shared by the target service and the trusted security server.

4. A method as in claim 1, wherein the step of comparing determines whether a proxy duration specified by the proxy authorization information has expired.

5. A method as in claim 1, wherein the step of submitting the request includes transmitting a ticket for authenticating the proxy client to the trusted security server.

6. A computer-readable medium having computer-executable instruction for a trusted security server to perform the steps:
   storing proxy authorization information from a user for authorizing a proxy client to act as a proxy of the user, the proxy authorization information identifying an extent of proxy authorization granted the proxy client by the user;
   receiving a proxy request from the proxy client to access a target service on behalf of the user;
   determining, based on the stored proxy authorization information of the user, whether to grant the proxy request;
   constructing a data structure containing authentication data recognizable by the target service for authenticating the proxy client for accessing the target service on behalf of the user, if it is determined to grant the proxy request.

7. A computer-readable medium as in claim 6, having further computer-executable instruction for performing the step of authenticating the user based on a password of the user before storing the proxy authorization information.

8. A computer-readable medium as in claim 6, wherein the step of receiving the proxy request includes authenticating the proxy client based on a ticket issued to the proxy client for communicating with the trusted security server.

9. A computer-readable medium as in claim 6, having further computer-executable instruction for performing the step of sending the data structure to the proxy client for presenting to the target service the authentication of the proxy client.

10. A computer-readable medium as in claim 6, wherein the data structure is encrypted with a key shared by the target service and the trusted security server.

11. A method as in claim 1, wherein the extent of proxy authorization comprises as restriction on a range of target services that the proxy client is authorized to access on behalf of the user.

12. A method as in claim 1, further comprising accessing, by the proxy client, the target service, the accessing being in a batch mode without user intervention.

13. A computer-readable medium having computer-executable instructions for performing steps:
    receiving a proxy request from a first user to access a target service, wherein access to the target service is restricted to a set of one or more users that excludes the first user and includes a second user;
    comparing the proxy request with a plurality of proxy authorizations maintained in the first data structure to determine whether to grant the proxy request, wherein each proxy authorization identifies a user granting proxy authorization, a user receiving proxy authorization and an extent of proxy authorization; and
    issuing a second data structure containing data recognizable by the target service for authenticating the first user to access the target service as a proxy of the second user, if the proxy request is granted.

14. A computer-readable medium as in claim 13, wherein each proxy authorization comprises a restriction on a range of target services that the user receiving proxy authorization is authorized is authorized to access on behalf of the user granting proxy authorization.

15. A computer-readable medium as in claim 13, wherein each proxy authorization comprises a restriction on a duration that the user receiving proxy authorization is authorized to act as a proxy of the user granting proxy authorization.

16. A computer-readable medium as in claim 13, wherein the second data structure is a ticket containing a key for use in a session formed between the first user and the target service.

17. A computer-readable medium as in claim 13, farther comprising authenticating the first user based on a ticket issued to the first user for communicating the proxy request.

18. A computer-readable medium as in claim 13, further comprising:
    receiving proxy authorization information regarding a given user; and
    storing proxy authorization information regarding the given user in the first data structure.

19. A computer-readable medium as in claim 18, wherein;
    the proxy authorization information regarding the given user is received from the given user; and
    the identity of the given user is authenticated.

20. A computer-readable medium as in claim 18, wherein:
    the proxy authorization information regarding the given user is received from an administrator; and
    the identity of the administrator is authenticated.

* * * * *